US012323833B2

(12) United States Patent
Ji et al.

(10) Patent No.: US 12,323,833 B2
(45) Date of Patent: Jun. 3, 2025

(54) ENHANCEMENT FOR MONITORING PC5 TO RADIO RESOURCE CONTROL (RRC) CONFIGURATION PROCEDURE IN NEW RADIO (NR) SIDELINK (SL)

(71) Applicant: NOKIA TECHNOLOGIES OY, Espoo (FI)

(72) Inventors: Lianghai Ji, Aalborg (DK); Jakob Lindbjerg Buthler, Aalborg (DK); Ling Yu, Kauniainen (FI); Berthold Panzner, Holzkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 425 days.

(21) Appl. No.: 17/918,015

(22) PCT Filed: Apr. 9, 2021

(86) PCT No.: PCT/EP2021/059274
§ 371 (c)(1),
(2) Date: Oct. 10, 2022

(87) PCT Pub. No.: WO2021/204989
PCT Pub. Date: Oct. 14, 2021

(65) Prior Publication Data
US 2023/0129741 A1 Apr. 27, 2023

Related U.S. Application Data

(60) Provisional application No. 63/007,450, filed on Apr. 9, 2020.

(51) Int. Cl.
*H04W 24/08* (2009.01)
*H04W 36/00* (2009.01)
*H04W 92/18* (2009.01)

(52) U.S. Cl.
CPC ..... *H04W 24/08* (2013.01); *H04W 36/00837* (2018.08); *H04W 92/18* (2013.01)

(58) Field of Classification Search
CPC ........... H04W 24/08; H04W 36/00837; H04W 92/18; H04W 76/14; H04W 88/04; H04W 76/23; H04W 76/19
See application file for complete search history.

(56) References Cited

U.S. PATENT DOCUMENTS

2015/0271861 A1  9/2015  Li et al.
2015/0365994 A1* 12/2015  Yu ..................... H04W 72/1268
                                                    370/336
(Continued)

FOREIGN PATENT DOCUMENTS

EP  3 179 766 A1  6/2017
JP  2017-509261 A  3/2017
(Continued)

OTHER PUBLICATIONS

International Search Report and Written Opinion dated Jun. 30, 2021 corresponding to International Patent Application No. PCT/EP2021/059274.
(Continued)

*Primary Examiner* — Nizam U Ahmed
(74) *Attorney, Agent, or Firm* — Lippes Mathias LLP

(57) ABSTRACT

Systems, methods, apparatuses, and computer program products for monitoring PC5 interface to radio resource control (PC5-RRC) configuration procedure, e.g., in new radio (NR) sidelink (SL) mode 1, are provided. One method may include configuring a SL user equipment (UE) with behaviors for handling and monitoring PC5-RRC procedures and one or more related timers by taking into account a status of an interface between the SL UE and the network node.

27 Claims, 7 Drawing Sheets

(56) References Cited

U.S. PATENT DOCUMENTS

| | | | |
|---|---|---|---|
| 2019/0045576 A1 | 2/2019 | Jung et al. | |
| 2021/0195666 A1* | 6/2021 | Luo | H04W 48/16 |
| 2022/0159776 A1* | 5/2022 | Li | H04L 43/065 |

FOREIGN PATENT DOCUMENTS

| | | |
|---|---|---|
| WO | 2014/047905 A1 | 4/2014 |
| WO | 2014/117854 A1 | 8/2014 |

OTHER PUBLICATIONS

3GPP TS 38.331 V15.9.0 (Mar. 2020), Technical Specification, 3rd Generation Partnership Project; Technical Specification Group Radio Access Network; NR; Radio Resource Control (RRC) protocol specification (Release 15), Mar. 2020.

Office Action received for corresponding Japanese Patent Application No. 2022-561440, dated Jul. 25, 2024, 3 pages of Office Action and 4 pages of summary and translation available.

Office Action dated Jan. 6, 2023, corresponding to Indian Patent Application No. 202247063063.

"Introduction of 5G V2X with NR sidelink", 3GPP TSG-RAN2 WG2 Meeting #108, R2-2001966, Huawei, Nov. 18-22, 2019, 491 pages.

"Report from session on LTE V2X and NR V2X", 3GPP TSG-RAN WG2 Meeting #109 electronic, R2-200xxxx, Agenda Item: 8.8, Samsung, Feb. 24-Mar. 6, 2020, pp. 1-15.

Office Action received for corresponding Japanese Patent Application No. 2022-561440, dated Oct. 31, 2023, 6 pages of Office Action and 7 pages of summary and translation available.

"Running CR to TS 38.331 for 5G V2X with NR sidelink", 3GPP TSG-RAN2 Meeting #109 electronic, R2-2000756, Huawei, Feb. 24-Mar. 6, 2020, 489 pages.

"Discussion on timer T400", 3GPP TSG-RAN WG2 Meeting #109e, R2-2001231, Agenda item: 6.4.2.1, Nokia, Feb. 24-Mar. 6, 2020, 2 pages.

"Remaining issues on RRC for NR V2X", 3GPP TSG-RAN WG2 Meeting #109bis-e, R2-2003312, Agenda item: 6.4.2.1, Nokia, Apr. 20-30, 2020, 5 pages.

* cited by examiner

ENHANCEMENT FOR MONITORING PC5 TO RADIO RESOURCE CONTROL (RRC) CONFIGURATION PROCEDURE IN NEW RADIO (NR) SIDELINK (SL)

CROSS-REFERENCE TO RELATED APPLICATIONS

This application claims priority from U.S. provisional patent application No. 63/007,450 filed on Apr. 9, 2020. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for monitoring PC5-radio resource control (RRC) configuration procedure in new radio (NR) sidelink (SL) mode 1.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

A first embodiment is directed to a method that may be performed by a network node. The method may include configuring a SL UE with behaviors for handling and monitoring the PC5 RRC procedures and related timers by taking into account a status of an interface between the SL UE and the network node (e.g., a Uu link).

For example, in a variant, the configuring may include configuring the SL UE for handling of a timer used for monitoring the PC5 RRC (re)configuration procedure.

In a variant, the timer may be a T400 timer. According to a variant, the configuring may include configuring the SL UE with multiple values for the timer or multiple different timers associated to the same PC5-RRC procedure. According to some variants, the different values or timers may be used according to the condition experienced from an interface between the SL UE and the network node, if there is physical layer problem or connection reestablishment procedure or a handover procedure via the interface. In a variant, the interface may be the Uu interface.

According to some variants, one value and/or timer may be used for the case where a physical layer problem via the interface is not detected and a connection reestablishment and/or a handover procedure is not initiated. In some variants, another value and/or timer may be configured to use, for example, when a physical layer problem is detected. According to some variants, another value and/or timer may be configured to use, for example, when a connection reestablishment is initiated. In some variants, another value and/or timer may be configured to use, for example, when a handover procedure is initiated. In some variants, another value and/or timer may be configured to use, for example, when the SL UE uses the exceptional resource pool to transmit the RRC Reconfiguration Sidelink message.

In a variant, the configuring may include configuring the SL UE to extend the timer (e.g., T400 timer) upon the detection of a physical layer problem or the initiation of the connection reestablishment procedure or the handover procedure, when the RRC Reconfiguration Sidelink message has been sent to the lower layers and the timer has started. According to some variants, the configuring may include configuring the SL UE with the extension values corresponding to conditions, such as experiencing a physical layer problem, performing a connection reestablishment or a handover procedure, or using an exceptional resource pool. In one variant, the extension of the timer may be related with the timer configured for monitoring the physical layer recovery procedure or the connection reestablishment procedure or the handover procedure.

A second embodiment may be directed to a method that may be performed by a SL UE, such as a SL TX UE. The method may include determining whether there is a radio problem of an interface between the SL TX UE and a network node. When it is determined that there is not a radio problem of the interface, the method may include generating or constructing a RRC Reconfiguration Sidelink message.

In a variant, the determining of whether there is a radio problem may include determining whether there is a physical layer problem or a connection re-establishment procedure or a handover procedure via an interface between the SL UE and the network. In an addition, in a variant, when it is determined that there is not a physical layer problem or a connection re-establishment procedure or a handover procedure via the interface, the method may include transmitting the RRC Reconfiguration Sidelink message to lower layers and starting timer T400.

In a variant, the determining of whether there is a radio problem may include determining at least one of: whether exceptional resource pool(s) is configured or not; and/or whether the UE has received configured grant type of resource(s) or not before the radio problem is detected.

According to one variant, the constructing of the RRC Reconfiguration Sidelink message may be performed at the RRC layer of the SL UE. In an example variant, the interface between the SL UE and the network may be the Uu interface.

In one variant, the transmitting may include the RRC layer at the SL UE sending the RRC Reconfiguration Sidelink message to the lower layers, only if there is not a physical layer problem or a connection re-establishment procedure or a handover procedure via the Uu interface.

According to a variant, when it is determined that there is a physical layer problem or a connection re-establishment procedure or a handover procedure via the interface, the method may include not generating or constructing the RRC Reconfiguration Sidelink message and not starting the timer used to monitor the PC5 RRC (re)configuration procedure. In a variant, the timer may be the T400 timer. In other words, in a variant, if there is a physical layer problem or a connection re-establishment procedure or a handover procedure via the interface (e.g., Uu interface), the RRC layer at the SL UE does not generate or construct the RRC Reconfiguration Sidelink message and the timer is not started.

In a variant, the determining may include checking timer(s) configured for monitoring the physical layer (e.g., Uu physical layer) recovery procedure and/or the connection reestablishment procedure and/or the handover procedure. For example in some variants, the checking may include checking if the T310 timer is running, which denotes that the SL UE has detected N310 consecutive out-of-sync indications from lower layers regarding the Uu interface. In a variant, when it is determined that there is a physical layer problem, the constructing may include constructing the RRC Reconfiguration Sidelink message after the physical layer problem is solved (e.g., when the T310 timer stops).

In another variant, when it is determined that there is a connection re-establishment procedure or a handover procedure via the interface, the constructing may include constructing the RRC Reconfiguration Sidelink message after the connection re-establishment or handing over to the target cell.

A third embodiment is directed to a method that may be performed by a SL UE. The method may include generating or constructing a RRC Reconfiguration Sidelink message and starting a timer used to monitor the PC5 RRC (re) configuration procedure. The method may include, after constructing the RRC Reconfiguration Sidelink message and starting the timer, detecting that there is a radio problem of an interface between the SL UE and a network node. The method may then include holding the value of the timer until the radio problem of the interface is resolved.

In a variant, the detecting that there is the radio problem of the interface may include detecting a physical layer problem or initiation of a connection re-establishment procedure or a handover procedure via the Uu interface.

In another variant, when a physical layer problem is detected or connection reestablishment procedure or handover procedure is started after constructing the RRC Reconfiguration Sidelink message and starting the timer (e.g., T400 timer), the method may include holding the value of the timer until the physical layer problem is resolved, or the connection re-establishment or the handover procedure is done, or the SL UE enters RRC idle mode. In this variant, once the physical layer problem is resolved or the connection re-establishment is performed in the same serving cell, the method may include starting the timer (e.g., T400 timer) using the existing value again.

In some variants, when a connection reestablishment procedure or a handover procedure is initiated, the method may include placing the timer (e.g., T400 timer) on hold. Upon a successful connection reestablishment or a successful handover procedure with a new serving cell or when the SL UE enters RRC idle mode without successful connection re-establishment or handover, the method may include checking if the PC5 configuration acquired from the new serving cell (in case of successful connection reestablishment and handover) or SIB/pre-configuration (in case of entering idle mode) complies with the configuration in the constructed RRC Reconfiguration Sidelink message. If it complies, the method may include starting the timer (e.g., T400 timer) with the existing value again. In case of entering idle mode and switching to SL mode 2, the method may include starting the timer (e.g., T400 timer) with the existing value once the sensing result is available at the SL UE to use SL mode 2. If it does not comply, the method may include constructing a new RRC Reconfiguration Sidelink message accordingly and restarting the timer (e.g., the value of T400 will be reset and T400 will start again) with the original/initial value.

In one variant, if the connection reestablishment procedure or the handover procedure has failed, the method may include switching to SL mode 2. In this variant, the method may include checking if the configuration acquired from SIB/pre-configuration complies with the configuration in the constructed RRC Reconfiguration Sidelink message. If it does comply, the method may include starting the timer (e.g., T400 timer). The method may further include starting the timer (e.g., T400 timer), with the existing value, once the sensing result is available to use SL mode 2. If it does not comply, the method may include constructing a new RRC Reconfiguration Sidelink message accordingly and starting the timer (e.g., T400 timer). The method may further include starting the timer (e.g., T400 timer), once the sensing result is available for using SL mode 2. In addition, in this variant, the method may include restarting the timer (e.g., T400 timer) with the original/initial value upon the transmission of the new RRC Reconfiguration Sidelink message to the lower layers.

In certain variants, the SL UE may be configured, by the network, with multiple values for the timer (e.g., T400 timer) or multiple different timers associated to the same PC5-RRC procedure. According to some examples, the different values or timers may be used according to the condition experienced from the interface between the SL UE and the network (e.g., Uu interface), e.g. if there is physical layer problem or connection reestablishment procedure or handover procedure via the (Uu) interface.

In another variant, the SL UE may be configured, by the network, to extend the timer (e.g., T400 timer) upon the detection of a physical layer problem or the initiation of the connection reestablishment procedure or a handover procedure, when the RRC Reconfiguration Sidelink message has been sent to the lower layers and the timer (e.g., T400 timer) has started. According to some examples, the SL UE may be configured with the extension values corresponding to conditions, such as experiencing a physical layer problem, performing a connection reestablishment or a handover procedure, or using an exceptional resource pool. In one variant, the extension of the timer may be related with the timers configured for monitoring the physical layer recovery procedure or the connection reestablishment procedure or the handover procedure, correspondingly.

A fourth embodiment is directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, and/or any other embodiments discussed herein, or any of the variants described above.

A fifth embodiment is directed to an apparatus that may include circuitry configured to perform the method according to the first embodiment, the second embodiment, the third embodiment, and/or any other embodiments discussed herein, or any of the variants described above. \

A sixth embodiment is directed to an apparatus that may include means for performing the method according to the first embodiment, the second embodiment, the third embodiment, and/or any other embodiments discussed herein, or any of the variants described above.

A seventh embodiment is directed to a non-transitory computer readable medium comprising program instructions stored thereon for performing at least the method according to the first embodiment, the second embodiment, the third embodiment, and/or any other embodiments discussed herein, or any of the variants described above.

BRIEF DESCRIPTION OF THE DRAWINGS

For proper understanding of example embodiments, reference should be made to the accompanying drawings, wherein.

DETAILED DESCRIPTION

Figure 1:
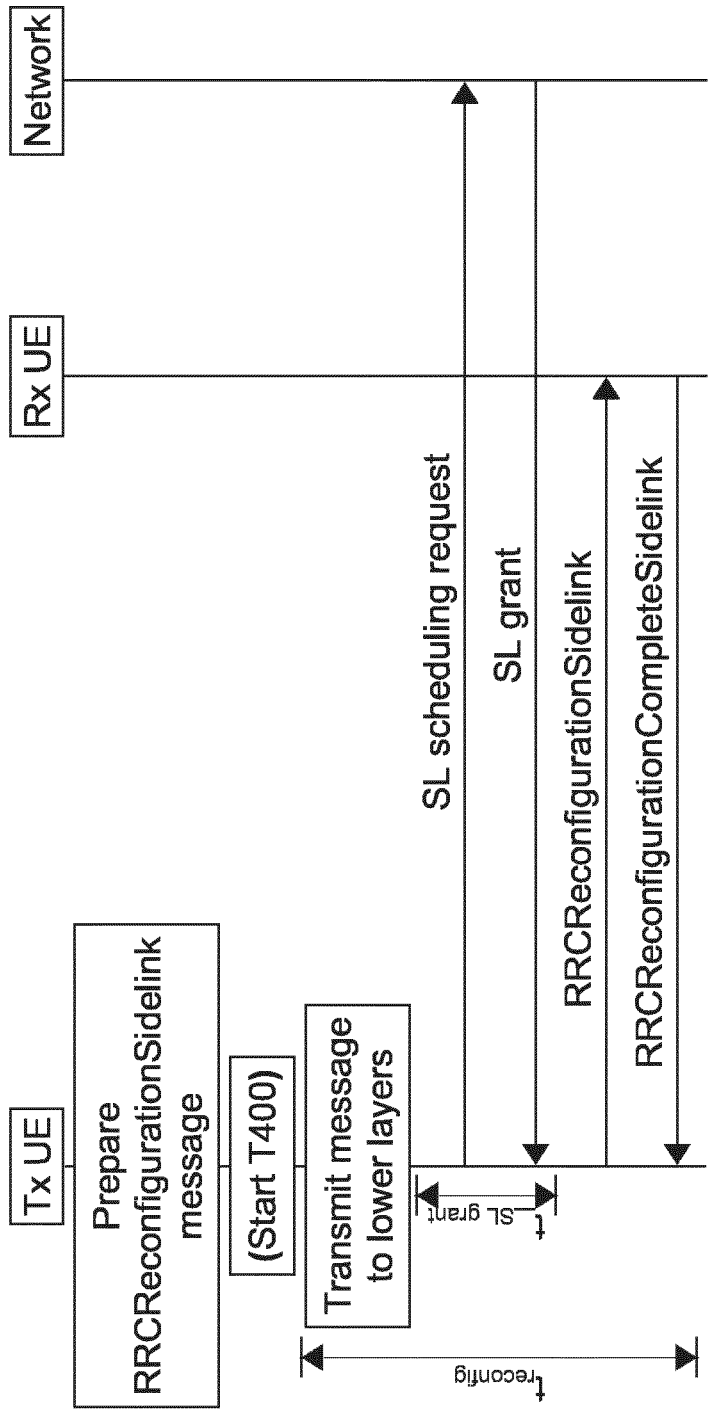
FIG. 1 illustrates an example signaling diagram depicting an example operation of transmitting a radio resource control (RRC) Reconfiguration Sidelink message (RRCReconfigurationSidelink message) by using SL mode 1, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for monitoring PC5 interface to RRC (PC5-RRC) configuration procedure in NR SL mode 1, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments may relate to $3^{rd}$ generation partnership project (3GPP) sidelink (SL) in Release-16 and beyond. An objective of NR SL is to provide high-reliability and low-latency communication (HRLLC), for example, in order to support advanced vehicle-to-everything (V2X) use cases.

NR V2X is targeted to be used to serve advanced V2X services, while LTE V2X serves the basic V2X services. In 3GPP Release-16 NR SL specification (e.g., 3GPP TS 38.331), it is indicated that the actions related to transmission of sidelink RRC reconfiguration (RRCReconfigurationSidelink) message include the UE setting the contents of the RRCReconfigurationSidelink message as discussed in the following.

For each SL data radio bearer (DRB) that is to be released, e.g., due to configuration by sl-ConfigDedicatedNR, system information block type x (SIBX), SidelinkPreconfigNR or by upper layers: the UE may set the slrb-PC5-ConfigIndex included in the slrb-ConfigToReleaseList corresponding to the SL DRB. For each SL DRB that is to be established or modified, e.g., due to receiving sl-ConfigDedicatedNR, SIBX, SidelinkPreconfigNR: the UE may set the SLRB-Config included in the slrb-ConfigToAddModList, according to the received sl-RadioBearerConfig and sl-RLC-BearerConfig corresponding to the SL DRB. For each NR SL measurement and report that is to be configured, the UE may set the sl-MeasConfig according to the stored NR SL measurement configuration information. The UE may submit the RRCReconfigurationSidelink message to lower layers for transmission and start timer T400, which is used to monitor the performance of the PC5 RRC (re)configuration procedure.

The above steps, therefore, indicate that when the PC5-RRC is to be configured or reconfigured, the timer T400 is started to detect any problems occurring during the PC5 (re)configuration procedure. The value of T400 may be defined by the network in the information element of SL-ConfigDedicatedNR, SIBX, or SidelinkPreconfigNR (e.g., t400-r16 ENUMERATED {ms100, ms200, ms300, ms400, ms600, ms1000, ms1500, ms2000}).

When the T400 expires and no feedback on RRCReconfigurationSidelink message has been received (i.e., RRCReconfigurationCompleteSidelink or RRCReconfigurationFailureSidelink message), the PC5-RRC connection will be handled by radio link failure (RLF) procedures. Thus, upon T400 expiry, the TX UE detects PC5-RRC RLF and performs the same operations as RLF. This means the TX UE will release the PC5 link and delete the associated configurations of this link.

Some timers related to relevant RRC procedures in Uu and PC5 interface are listed in TABLE 1 below.

problem may refer to, for example, a problem, condition or status via the Uu interface, which prevents the UE to request SL resource from the network, e.g., experiencing a physical layer problem, performing a connection reestablishment procedure, and/or a handover procedure.

In case there is configured exceptional resource pool(s), the UE may transmit the RRCReconfigurationSidelink mes-

TABLE 1

| Timer | Start | Stop | At expiry |
| --- | --- | --- | --- |
| T301 | Upon transmission of RRCReestablishmentRequest | Upon reception of RRCReestablishment or RRCSetup message as well as when the selected cell becomes unsuitable | Go to RRC_IDLE |
| T304 | Upon reception of RRCReconfiguration message including reconfigurationWithSync | Upon successful completion of random access on the corresponding SpCell For T304 of SCG, upon SCG release | For T304 of MCG, in case of the handover from NR or intra-NR handover, initiate the RRC re-establishment procedure; In case of handover to NR, perform the actions defined in the specifications applicable for the source RAT. For T304 of SCG, inform network about the reconfiguration with sync failure by initiating the SCG failure information procedure as specified in 5.7.3. |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept | If the T310 is kept in MCG: If AS security is not activated: go to RRC_IDLE else: initiate the connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |
| T400 | Upon transmission of RRCReconfigurationSidelink | Upon reception of RRCReconfigurationFailureSidelink or | Perform the sidelink RRC reconfiguration failure procedure as specified in 5.x.9.1.8 |

FIG. 1 illustrates an example signaling diagram depicting an example operation of transmitting the RRCReconfigurationSidelink message by using SL mode 1 (i.e., in mode 1, initiating UE needs to request for SL transmission resources from its serving network). As illustrated in the example of FIG. 1, compared to the Uu interface, NR SL in mode 1 requests SL resource from the network to transmit the RRCReconfigurationSidelink message. It is noted that the time period may be denoted as t_SL_grant in this disclosure. As depicted in the example of FIG. 1, t_SL_grant may be the time it takes for a SL connection to obtain a resource in the system.

In SL mode 1, t_SL_grant may depend on the radio condition of the Uu link and congestion on the Uu interface. For instance, after the RRCReconfigurationSidelink message is constructed, it may be given to the lower layers for transmission and the timer T400 may be started. Afterwards, the UE may need to request for a SL resource, e.g., using buffer status report, scheduling request, or random access procedure. However, if there is a radio link problem from the Uu interface and there is no exceptional resource pool, the UE may need to first resolve the Uu radio link problem (e.g., perform RRC reestablishment procedure) before it can obtain the SL resource from network. Thus, the UE may not be able to transmit the RRCReconfigurationSidelink message before T400 expires, if the Uu radio link problem is not resolved before the expiry of T400; and, if the radio link problem is resolved before T400 expires, the remaining time until its expiry may not be long enough to perform the SL RRC reconfiguration procedure. As used herein, a radio link sage by using the configured exceptional resource pool(s), when it experiences a problem from Uu that prevents the UE in mode 1 from requesting sidelink resource from the network. However, as the UE needs to randomly select a resource from the exceptional resource pool(s), it cannot ensure a good sidelink performance. Thus, in this case, timer T400 may also expire due to the bad performance of using the exceptional resource pool(s). As the exceptional resource pool(s) is/are only used temporarily, and the UE will later switch back to the normal operations, e.g., requesting resource from network or even switching to sensing-based resource selection in mode 2, it is unreasonable to determine the sidelink performance by monitoring its temporary performance during the time when the exceptional resource pool is used.

Upon the expiry of T400, the TX-UE may consider it as PC5-RRC RLF and release the PC5 radio link. In this case, the V2X services between the two SL UEs cannot be supported via PC5, not really due to PC5 radio link problem, but due to radio link problem of Uu interface, which may be recovered by, e.g., solving the physical layer problem, reestablishing the RRC connection in the new serving cell, handing over to a target cell or ended up with UE entering RRC idle mode (e.g. due to expiry of T301, T310, or T311). In this case, the PC5 connection and communication can actually continue. Therefore, it may be desirable that PC5-RRC RLF triggered by T400 expiration due to Uu radio link problem is avoided to the extent possible.

It is noted that the reason for having the T400 timer may include to timely detect issues with a PC5 connection. In current 3GPP V2X discussions, the discrepancy between the generation of the RRCReconfigurationSidelink message at the TX-UE and its actual transmission to the peer UE and the corresponding discrepancy of the T400 timer is not addressed. However, setting the timer T400 to a large value will not allow a timely detection of a PC5 connection with problems, and may impact the system in several ways. For example, taking into account the worst case (which is also not easy to predict) from the Uu interface to configure T400, may result in the Tx UE waiting much longer than necessary to perform RLF/RLM. The timer T400 is introduced to monitor the SL performance, and it should not be used to monitor the Uu link, which will be handled by the other timers/procedures. Making T400 too large may have the same effect as the case where no timer is used. Thus, the meaning of introducing the timer T400 will be lost. Further, setting the timer T400 to its largest value (e.g., 2 seconds) does not solve the problem mentioned above. On the other hand, a larger value of T400 will delay the detection of the problem over PC5 link.

Certain example embodiments may be directed to solving at least the difficulties of setting the timer(s) to monitor the procedure of SL RRC configuration in NR SL mode 1. For example, one or multiple embodiment(s) may provide new UE behaviours on handling on PC5 RRC procedures and related timers by taking into account Uu link status/problem.

In one embodiment, the RRC layer at the sidelink TX-UE (e.g., the initiating TX-UE) may construct the RRCReconfigurationSidelink message and send it to the lower layers, when there is no radio problem (e.g. a physical layer problem is not detected, and/or a connection re-establishment procedure or a handover procedure is not performed) via the Uu interface, which prevents the UE from requesting a SL resource from network. For instance, in an embodiment, the RRC layer at the TX UE may construct the RRCReconfigurationSidelink message and send it to the lower layers, only if there is not a physical layer problem or a connection re-establishment procedure or a handover procedure via the Uu interface. Otherwise, in an embodiment, the RRC layer at the TX-UE should not submit the RRCReconfigurationSidelink message to lower layers and, therefore, the timer T400 should not start in this case. Therefore, in this case, the SL reconfiguration failure will not be detected due to the problem of the Uu interface. The PC5 RRC (re)configuration procedure will be initiated when physical layer problem of the Uu interface is resolved, or the connection re-establishment procedure or the handover procedure via the Uu interface is performed or the Tx UE enters RRC Idle mode.

For example, the TX-UE may check if its timer T310 is running, which denotes that the TX-UE has detected N310 consecutive out-of-sync indications from lower layers regarding the Uu interface. Thus, if T400 is started without noticing the timer T310 is running, T400 may expire before the physical layer problem is resolved, and it results in a release of the PC5 link, which is unreasonable as it does not reflect the status of the PC5 link. In this case, the TX-UE should construct the RRCReconfigurationSidelink message after the physical layer problem is solved, e.g., upon T310 stops.

The same principle may also apply if the TX-UE is trying to perform a Uu connection reestablishment procedure, e.g., when T301 or T311 is running In this case, the TX-UE cannot obtain a SL resource from network before the Uu connection is re-established. Thus, T400 should not start in this case in order to avoid that T400 expires before the Uu connection establishment is done, since it will release the PC5 link if T400 expires. In addition, if the UE re-establishes the Uu connection to a new cell, it may obtain new PC5 configuration from the new cell. Therefore, it would be reasonable to wait and construct the RRCReconfigurationSidelink message after the Uu connection re-establishment.

In another example, upon receiving RRCReconfiguration message including reconfigurationWithSync, the UE will start its timer T304 and perform handover to the corresponding special cell (SpCell). Thus, the UE cannot request sidelink resource from network before the handover procedure is successful. Again, as the UE may obtain new PC5 configuration from the target cell, it would be reasonable to wait and construct the RRCReconfigurationSidelink message after the handover procedure.

In another embodiment, if the TX-UE detects a Uu physical layer problem or initiates the Uu connection reestablishment or the handover procedure after constructing the RRCReconfigurationSidelink message and starting T400, the TX-UE may hold the value of the timer T400 until the Uu physical layer problem is resolved, or the Uu connection re-establishment or the handover procedure is done, or the UE enters RRC idle mode. For example, when the TX-UE detects a physical layer problem (e.g., the timer T310 starts or the radio channel condition is worse than a configured threshold), the timer T400 will be placed on hold (in other words, T400 will stop but without resetting to its initial value). Once the Uu physical layer problem is resolved in the same serving cell (e.g., T310 stops or the radio channel condition is better than a configured threshold), T400 can continue to run.

In case the TX-UE initiates a Uu connection reestablishment procedure (e.g., due to an RLC failure as the maximal retransmission via the Uu interface has achieved the maximal number, or a handover failure) or starts a handover procedure, the timer T400 should also be placed on hold. Upon a successful Uu re-establishment with the same serving cell, T400 can continue to run. Upon a successful Uu reestablishment or handover with a new serving cell, or when the UE enters RRC idle mode due to failed Uu re-establishment or handover failure, the TX-UE may check if the PC5 configuration acquired from new serving cell (in case of successful Uu reestablishment) or SIB/pre-configuration (in case of entering idle mode) complies with the configuration in the constructed RRCReconfigurationSidelink message. If it complies, the timer T400 may continue to run. In case of UE entering idle mode and switch to SL mode 2, T400 continues to run once the sensing result is available at the TX-UE to use SL mode 2. If it does not comply, the UE may construct a new RRCReconfigurationSidelink message accordingly and restart the timer T400 (i.e., the value of T400 will be reset to 0 and T400 will start again), once the sensing result is available for using SL mode 2. For instance, in this case, the UE may construct a new RRCReconfigurationSidelink message and restart the timer T400 upon the transmission of the new RRCReconfigurationSidelink message.

In one example, if the Uu connection reestablishment procedure or the handover procedure has failed, the UE may switch to SL mode 2 (i.e., UE-autonomous resource-selection mode). In this case, the TX-UE may check if the configuration acquired from SIB/pre-configuration complies with the configuration in the constructed RRCReconfigurationSidelink message. If it does comply, the timer T400 may continue to run, once the sensing result is available at the UE to use SL mode 2. If it does not comply, the TX-UE may construct a new RRCReconfigurationSidelink message accordingly, once the sensing result is available for using SL mode 2. And, the UE may restart the timer T400 upon the transmission of the new RRCReconfigurationSidelink message to the lower layers.

Figure 2:
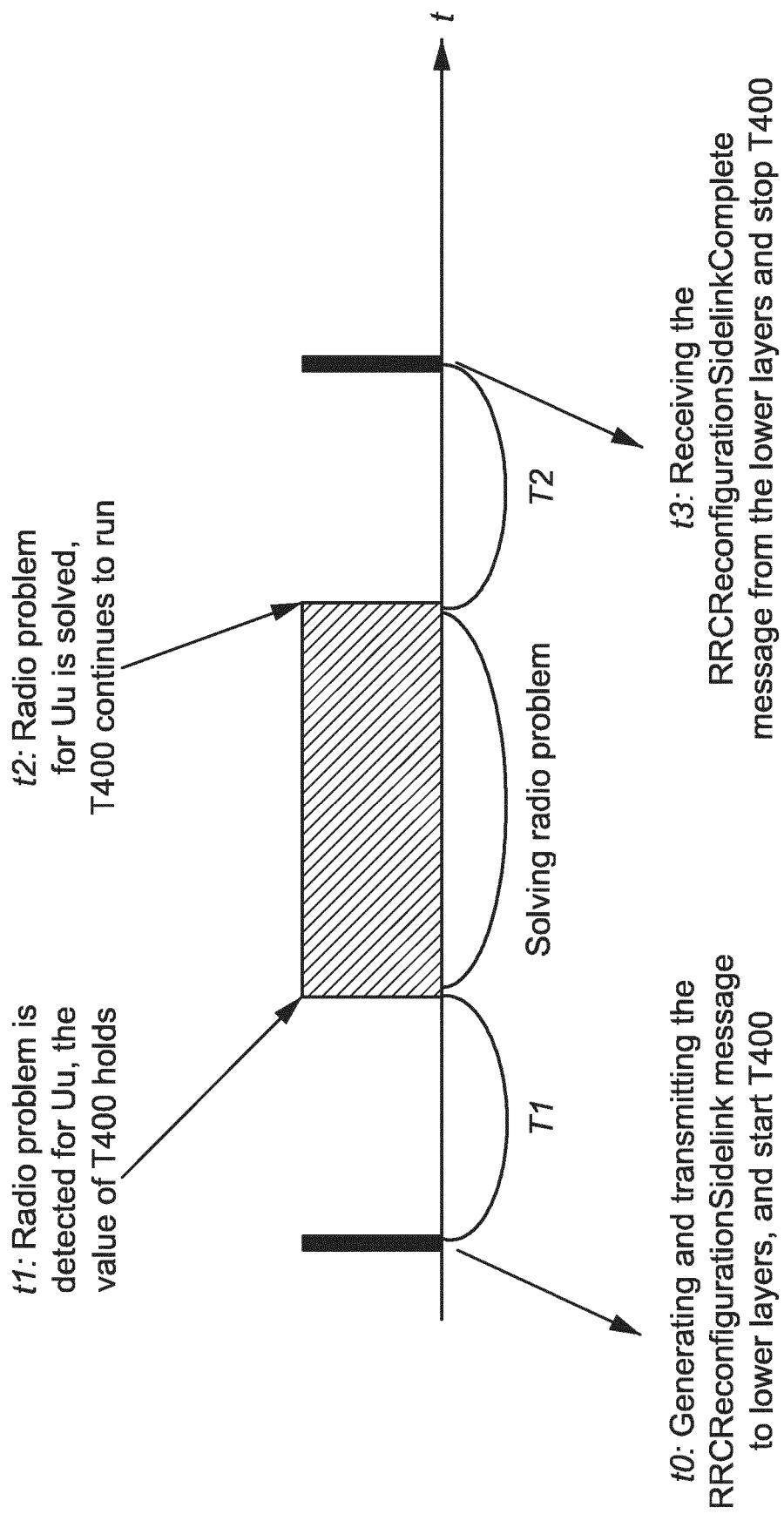
FIG. 2 illustrates a diagram depicting an example where a UE experiences a physical layer problem, according to one embodiment.

FIG. 2 illustrates an example of an embodiment where a UE experiences a physical layer problem. In the example of FIG. 2, after RRC transmitting the RRCReconfigurationSidelink message to the lower layers, T400 starts at t0. At t1, the SL TX-UE experiences a physical layer problem (e.g., T310 starts). Thus, the SL TX-UE will hold T400, e.g., T400=T1. At a later point, e.g., t2, the radio problem is solved (e.g., T310 stops), and the SL TX-UE is able to communicate with the same serving cell as before. Thus, the SL TX-UE will not hold T400 anymore and let it continue to run from T400=T1. At t3, the SL TX-UE will receive the feedback message from the peer UE. Thus, in this example embodiment, T400 will run in the duration of T1 and T2, but is not used to monitor the procedure where the Uu link has problems (i.e., between t1 and t2), which will be handled by other timers (e.g., T310). As long as T1+T2 is smaller than the configured value of timer T400, the PC5 RRC (re) configuration procedure is considered as successful, and it prevents the UE from declaring an RLF and releasing the PC5 connection due to a problem of Uu.

Figure 3:
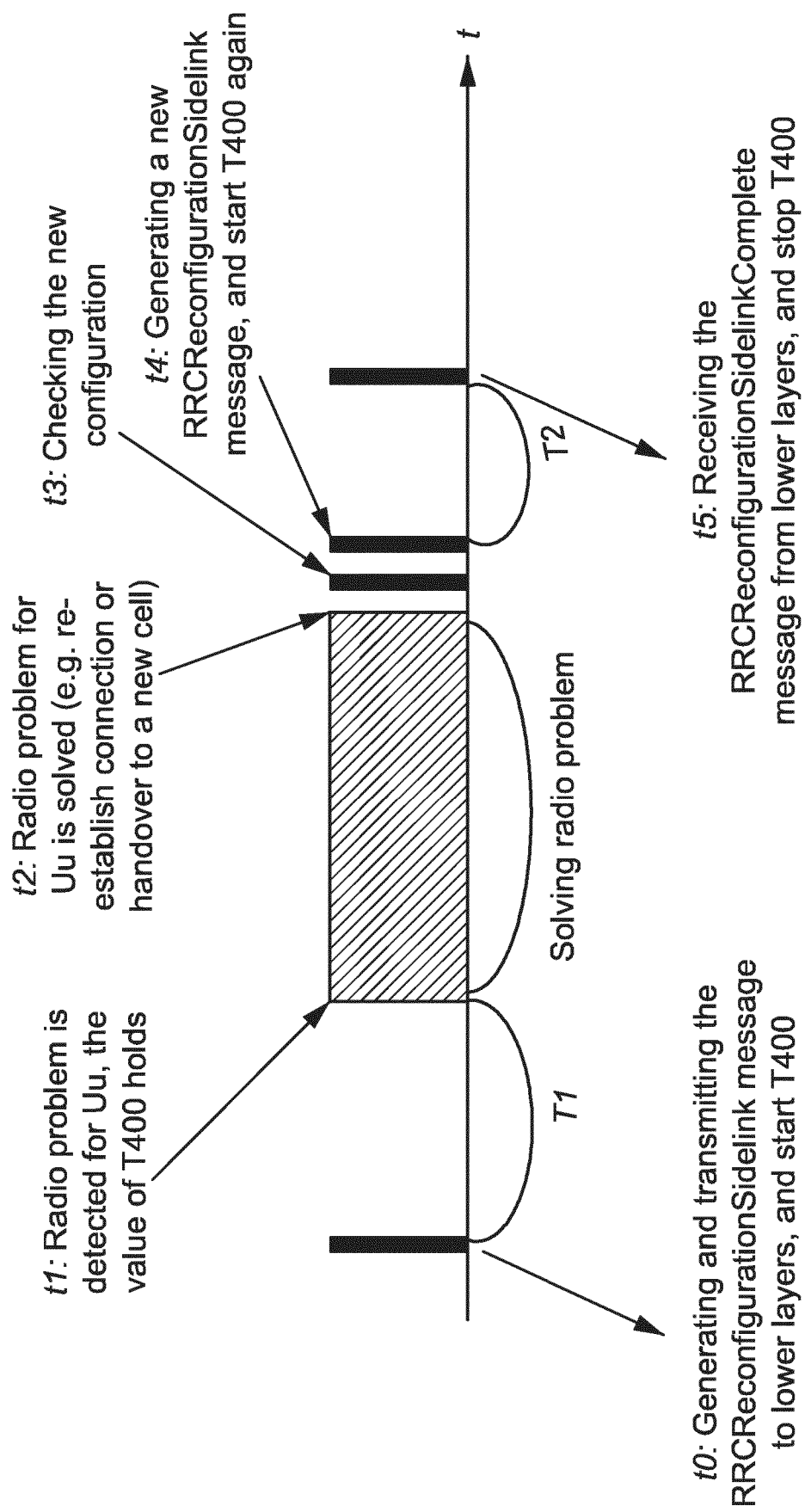
FIG. 3 illustrates a diagram depicting an example where the radio problem is solved by re-establishing RRC connection to a new cell, according to an embodiment.

FIG. 3 illustrates an example of an embodiment where the radio problem is solved by re-establishing RRC connection or handing over to a new cell. As illustrated in the example of FIG. 3, at t2, the SL TX-UE has re-established its RRC connection or handed over to a new cell. In this case, at t3, the SL TX-UE will check if the new configuration from the new cell complies with the RRCReconfigurationSidelink message, which was generated at t0. If not, as shown in the example of FIG. 3, it needs to generate a new RRCReconfigurationSidelink message at t4, according to the new configuration obtained from the new cell. In addition, the timer T400 will start from its initial value. In this case, as long as T2 is smaller than the configured value of timer T400, the PC5 RRC (re)configuration procedure is considered as successful, and it prevents the UE from declaring an RLF and releasing the PC5 connection due to a problem of Uu. In case the configuration from the new cell complies with the RRCReconfigurationSidelink message generated at t0, the timer may continue from T400=T1 (please note this case is not shown in the example of FIG. 3).

Figure 4:
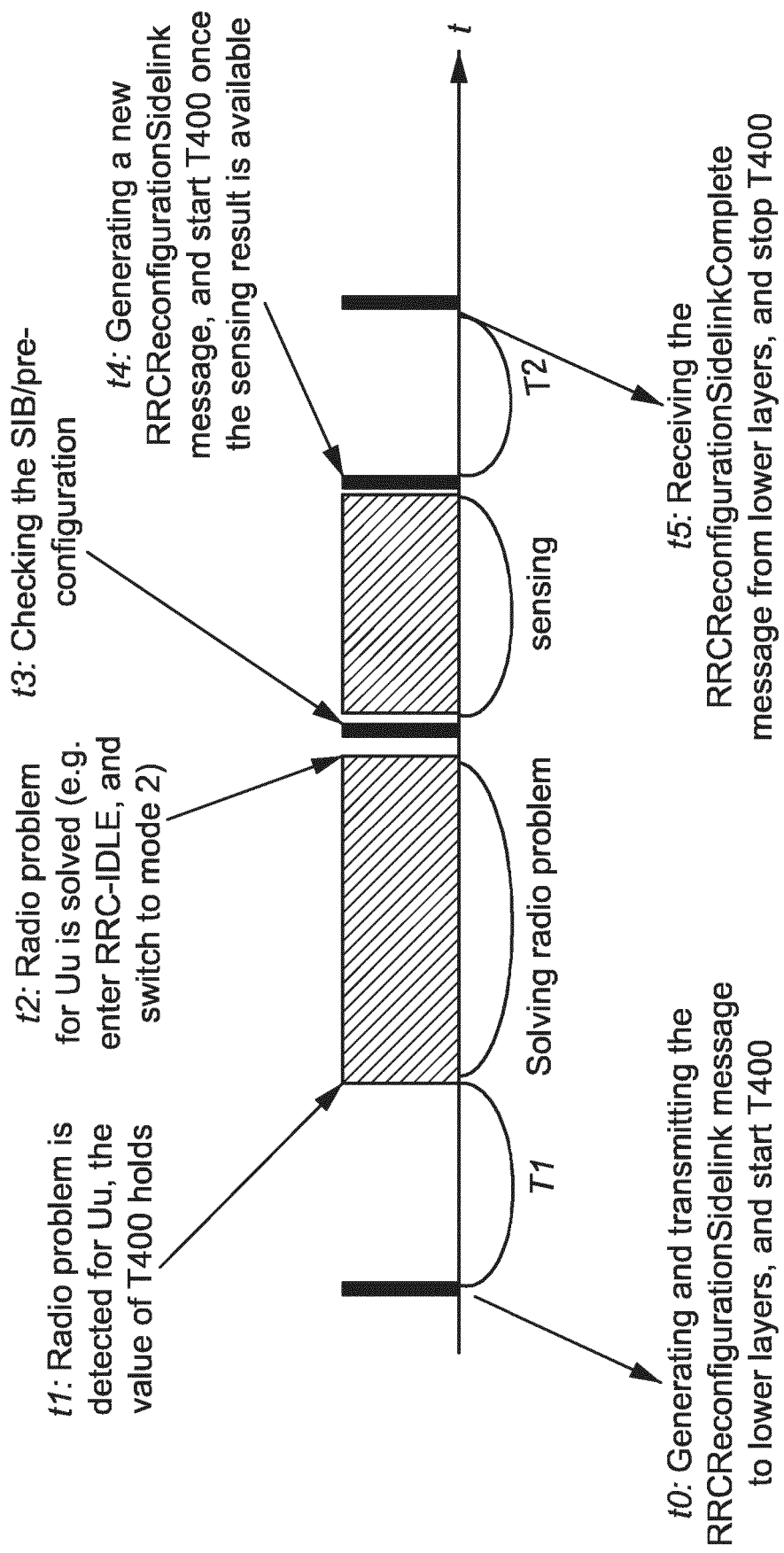
FIG. 4 illustrates a diagram depicting an example where the SL transmitting (TX)-UE enters the RRC-IDLE state and switches to SL mode 2, according to an embodiment.

FIG. 4 illustrates an example embodiment where the SL TX-UE enters the RRC-IDLE state (e.g., due to expiry of T301, T310, or T311) and switches to SL mode 2. As illustrated in the example of FIG. 4, the UE may read the SIB/pre-configuration at t3, in order to see if the RRCReconfigurationSidelink message generated at t0 complies with the configuration obtained from the new state. If not, as depicted in the example of FIG. 4, the UE may generate a new RRCReconfigurationSidelink message and start the timer T400 from its initial value, once the sensing result is available, e.g. at t4. In this case, as long as T2 is smaller than the configured value of timer T400, the PC5 RRC (re) configuration procedure is considered as successful, and it prevents the UE from declaring an RLF and releasing the PC5 connection due to a problem of Uu.

In a further embodiment, the TX-UE can be configured with multiple values for T400 or multiple different T400-like timers associated to the same PC5-RRC procedure. The different values or timers may be used/configured according to the different conditions experienced from the Uu interface, e.g., if there is physical layer problem or connection reestablishment procedure or handover procedure via Uu. For example, one value and/or timer may be used for the case that Uu physical layer problem is not detected and a Uu connection reestablishment and a handover is not initiated. Another value and/or timer may be configured to use, e.g., if a Uu physical layer problem is detected. In this case, upon the detection of such a physical layer problem, the RRC layer updates the value, which will be used to detect the expiry of T400 in this special. Another value and/or timer may be configured to use, e.g., if a Uu connection reestablishment is initiated. Another value and/or timer may be configured to use, e.g., if a handover procedure is initiated. Another value and/or timer may be configured to use, e.g., if the SL TX-UE uses the exceptional resource pool to transmit the RRCReconfigurationSidelink message. It is noted that, the multiple values for T400 or multiple different T400-like timers can be applied for the case where the radio problem of Uu is detected before and/or after the submission of the RRCReconfigurationSidelink message to lower layers. Thus, in this approach, the different values or timers used to monitor the PC5 RRC (re)configuration procedure can be configured/updated according to the different radio conditions of the Uu interface.

In another embodiment, the TX-UE may be configured to extend the timer T400 upon the detection of a Uu physical layer problem or the initiation of the Uu reestablishment procedure or the handover procedure, if the RRCReconfigurationSidelink message has been sent to the lower layers and T400 has started. According to some examples, the UE may be configured by network with the extension values corresponding to the above-mentioned conditions, e.g., experiencing Uu physical layer problem, performing Uu connection reestablishment, performing handover procedure, or using exceptional resource pool. In one example, the extension of the timer may be related with the timer configured for monitoring the Uu physical layer recovery procedure or the Uu connection reestablishment procedure or the handover procedure. For instance, if the TX-UE has been configured with a constant T0 for T400 and constants T1, T2, and T3 to detect the expiry of T301, T310, and T311 correspondingly, then: If the TX-UE detects a physical layer problem that triggers the start of T310, the constant for T400 can be extended as (T0+T2); If the physical layer problem can not be resolved and T310 expires, the TX-UE may initiate a Uu connection reestablishment procedure, which includes the procedure to select a suitable cell and another procedure to request for RRC reestablishment via the Uu interface. In this case, the constant for T400 can be extended as (T0+T2+T3+T1). In an example embodiment, the TX-UE may also initiate a Uu connection reestablishment procedure due to other triggers (e.g. RLC failure as the maximum number of retransmissions has been reached). In this case, the constant for T400 can be extended as (T0+T3+T1). It should be noted that the above examples do not restrict the scope of this embodiment, but only serve as some examples to more readily aid the understanding of this embodiment.

It is noted that, according to certain embodiments, an RRCReconfigurationSidelink message is considered as being transmitted, once it has been provided from the RRC layer to the lower layers.

Figures 5A, 5B:
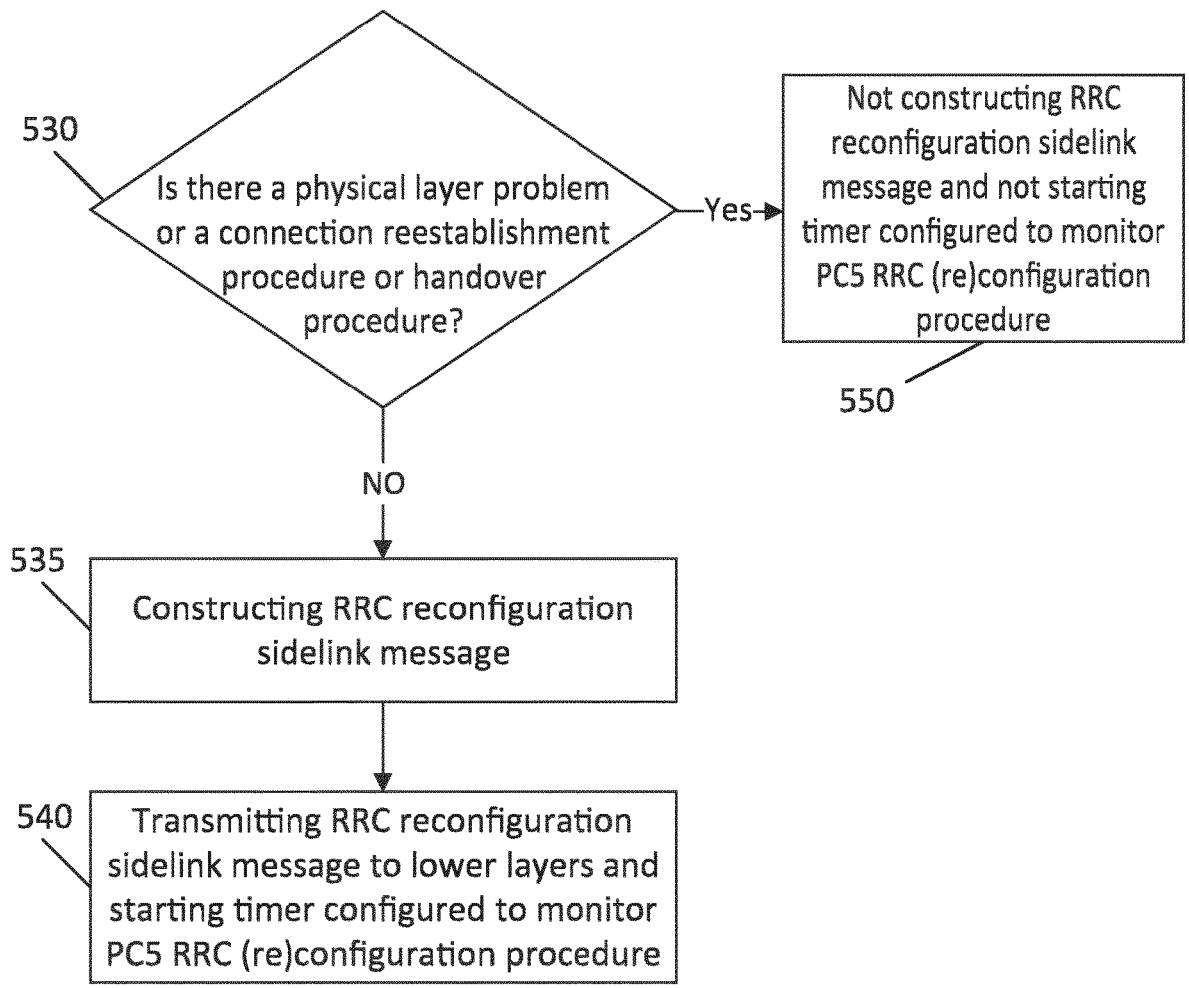
FIG. 5a illustrates an example flow diagram of a method, according to one example embodiment.
FIG. 5b illustrates an example flow diagram of a method, according to one example embodiment.

FIG. 5a illustrates an example flow diagram of a method relating to monitoring PC5-RRC configuration procedure, e.g., in NR SL mode 1, according to one example embodiment. In certain example embodiments, the flow diagram of FIG. 5a may be performed by a network entity or network node in a communication system, such as LTE or 5G NR. For instance, in some example embodiments, the network node performing the method of FIG. 5a may include a base station, eNB, gNB, and/or NG-RAN node, or the like.

As illustrated in the example of FIG. 5a, the method may include, at 500, configuring a SL UE with behaviors on handling and monitoring the PC5 RRC procedures and related timers by taking into account Uu link status/problem.

In an embodiment, the configuring 500 may include configuring the SL UE such that its RRC layer may construct the RRCReconfigurationSidelink message and send it to the lower layers, when there is no radio problem (e.g., a physical layer problem is not detected, and/or a connection re-establishment procedure or a handover procedure is not performed) via the Uu interface, which prevents the SL UE from requesting a SL resource from the network node. For instance, in an embodiment, the RRC layer at the SL UE may be configured to construct the RRCReconfiguration-Sidelink message and send it to the lower layers, only if there is not a physical layer problem or a connection re-establishment procedure or a handover procedure via the Uu interface. Otherwise, in an embodiment, the configuring 500 may include configuring the SL UE such that its RRC layer should not submit the RRCReconfigurationSidelink message to lower layers and, therefore, the timer T400 should not start in this case.

In another embodiment, the configuring 500 may include configuring the SL UE such that, if the SL UE detects a Uu physical layer problem or initiates the Uu connection reestablishment or the handover procedure after constructing the RRCReconfigurationSidelink message and starting T400, the SL UE is configured to hold the value of the timer T400 until the Uu physical layer problem is resolved, or the Uu connection re-establishment or the handover procedure is done, or the SL UE enters RRC idle mode. For example, when the SL UE detects a physical layer problem (e.g., the timer T310 starts or the radio channel condition is worse than a configured threshold), the SL UE is configured to place the timer T400 on hold (in other words, T400 will stop but without resetting to its initial value). Once the Uu physical layer problem is resolved in the same serving cell (e.g., T310 stops or the radio channel condition is better than a configured threshold), the SL UE is configured to restart the timer T400 so that it can continue to run.

For example, in one embodiment, the configuring 500 may include configuring the SL UE for handling of a timer (e.g., T400 timer) used for determining when to perform SL reconfiguration failure procedure. In an embodiment, the configuring 500 may include configuring the SL UE with multiple values for the timer (e.g., T400) or multiple different similar timers associated to the same PC5-RRC procedure. According to some examples, the different values or timers may be used according to the condition experienced from the interface between the SL UE and the network (e.g., Uu interface), if there is physical layer problem or connection reestablishment procedure or handover procedure via the (Uu) interface. For example, one value and/or timer may be used for the case where neither a physical layer problem is detected nor a connection reestablishment is initiated. Another value and/or timer may be configured to use, for example, when a physical layer problem is detected. In this case, upon the detection of such a physical layer problem, the RRC layer may update the constant that will be used to detect the expiry of the timer (e.g., T400 timer). Another value and/or timer may be configured to use, for example, when a connection reestablishment is initiated. Another value and/or timer may be configured to use, for example, when the SL UE uses the exceptional resource pool to transmit the RRC Reconfiguration Sidelink message.

In an embodiment, the configuring 500 may include configuring the SL UE to extend the timer (e.g., T400 timer) upon the detection of a physical layer problem or the initiation of the connection reestablishment procedure, when the RRC Reconfiguration Sidelink message has been sent to the lower layers and the timer (e.g., T400 timer) has started. According to some examples, the configuring 500 may include configuring the SL UE with the extension values corresponding to the above-mentioned conditions, e.g., experiencing a physical layer problem, performing a connection reestablishment, or using an exceptional resource pool. In one example, the extension of the timer may be related with the timer configured for monitoring the physical layer recovery procedure or the connection reestablishment procedure. For instance, if the SL UE has been configured with a constant T0 for the T400 timer and constants T1, T2, and T3 to detect the expiry of T301, T310, and T311 timers correspondingly, then: if the SL UE detects a physical layer problem that triggers the start of T310, the constant for T400 can be extended as (T0+T2); if the physical layer problem cannot be resolved and T310 expires, the SL UE may initiate a Uu connection reestablishment procedure, which includes the procedure to select a suitable cell and another procedure to request for RRC reestablishment via the Uu interface. In this case, the constant for the T400 timer can be extended as (T0+T2+T3+T1). In an example embodiment, the method may include configuring the SL UE to initiate a Uu connection reestablishment procedure due to other triggers (e.g., RLC failure as the maximum number of retransmissions has been reached). In this case, the constant for the T400 timer can be extended as (T0+T3+T1).

FIG. 5b illustrates an example flow diagram of a method for monitoring PC5-RRC configuration procedure, e.g., in NR SL mode 1, according to one example embodiment. In certain example embodiments, the flow diagram of FIG. 5b may be performed by a network entity or network node in a communications system, such as LTE or 5G NR. For instance, in some example embodiments, the network entity performing the method of FIG. 5b may include a UE, such as a SL UE (e.g., SL TX UE or SL RX UE), mobile station, IoT device, or the like.

In an embodiment, the method of FIG. 5b may include, at 530, determining whether there is a radio problem. For example, the determining 530 may include determining whether there is a physical layer problem or a connection re-establishment procedure or a handover procedure via an interface between the SL UE and the network (e.g., the Uu interface). In an embodiment, when it is determined at 530 that there is not a radio problem (e.g., there is no physical layer problem, no connection re-establishment procedure via the Uu interface, and/or no handover procedure performed), the method may include, at 535, constructing a RRC Reconfiguration Sidelink message. The method may then include, at 540, transmitting the RRC Reconfiguration Sidelink message to the lower layers and starting the timer used to monitor the PC5 RRC (re)configuration procedure (e.g., timer T400). For instance, in an embodiment, the transmitting 540 may include the RRC layer at the SL UE sending the RRC Reconfiguration Sidelink message to the lower layers, only if there is not a physical layer problem or a connection re-establishment procedure or a handover procedure via the Uu interface. Otherwise, when it is determined at 530 that there is a radio problem (e.g., physical layer problem or a connection re-establishment procedure or a handover procedure via the Uu interface), the method may include, at 550, not constructing RRC reconfiguration sidelink message and not starting the timer used to monitor the PC5 RRC (re)configuration procedure (e.g., timer T400).

Figure 5C:
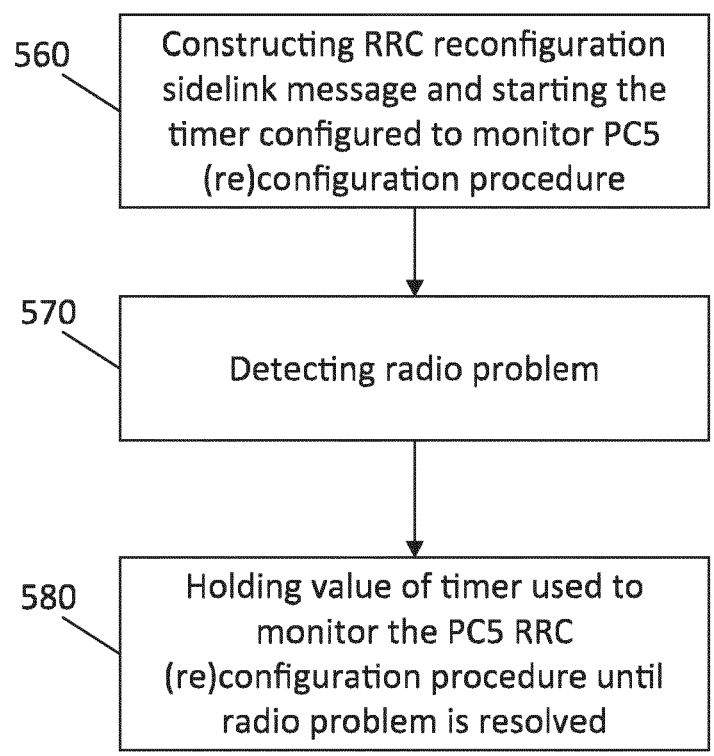
FIG. 5c illustrates an example flow diagram of a method, according to an example embodiment.

FIG. 5c illustrates an example flow diagram of a method for monitoring PC5-RRC configuration procedure, e.g., in NR SL mode 1, according to another example embodiment. In certain example embodiments, the flow diagram of FIG. 5c may be performed by a network entity or network node in a communications system, such as LTE or 5G NR. For instance, in some example embodiments, the network entity performing the method of FIG. 5c may include a UE, such as a SL UE (e.g., SL TX UE or SL RX UE), mobile station, IoT device, or the like.

In an embodiment, the method of FIG. 5c may include, at 560, constructing a RRC Reconfiguration Sidelink message, submitting it to lower layers, and starting a timer used to monitor the PC5 RRC (re)configuration procedure (e.g., timer T400). According to an embodiment, after constructing the RRC Reconfiguration Sidelink message, submitting it to lower layers, and starting the timer, the method may then include, at 570, detecting that there is a radio problem (e.g., physical layer problem or a connection re-establishment procedure or a handover procedure via the Uu interface). In an embodiment, the method may include, at 580, holding the value of the timer (e.g., T400) until the radio problem is resolved. For example, the radio problem may be resolved when the physical layer problem is resolved, when the connection re-establishment procedure in the same serving cell or handover procedure to a new cell via the interface (e.g., Uu interface) is completed.

Thus, in one embodiment illustrated in the example of FIG. 5c, when a physical layer problem is detected or connection reestablishment procedure is started after constructing the RRC Reconfiguration Sidelink message and starting the T400 timer, the method may include holding the value of the timer T400 until the physical layer problem is resolved, the connection re-establishment or handover procedure is done, or the UE enters RRC idle mode.

In an embodiment, the detecting 570 may include checking if the T310 timer is running, which denotes that the SL UE has detected N310 consecutive out-of-sync indications from lower layers regarding the Uu interface.

For example, when a physical layer problem is detected (e.g., the timer T310 starts or the radio channel condition is worse than a configured threshold), the method may include placing the timer T400 on hold (in other words, T400 timer will stop but without resetting its value to the initial value). Once the physical layer problem is resolved in the same serving cell (e.g., T310 stops or the radio channel condition is better than a configured threshold), the method may include starting the T400 timer again.

In an embodiment, when a connection reestablishment procedure is initiated (e.g., due to an RLC failure as the maximal retransmission via the Uu interface has achieved the maximal number, or a handover failure) or a handover procedure is started, the method may include placing the timer T400 on hold. Upon a successful Uu re-establishment with the same serving cell, T400 can continue to run. Upon a successful connection reestablishment or handover with a new serving cell, or when the UE enters RRC idle mode without successful connection re-establishment, the method may include checking if the PC5 configuration acquired from the new serving cell (in case of successful Uu reestablishment) or SIB/pre-configuration (in case of entering idle mode) complies with the configuration in the constructed RRC Reconfiguration Sidelink message. If it complies, the method may include starting the timer T400 again. In case of entering idle mode and switching to SL mode 2, the method may include starting the T400 timer once the sensing result is available at the SL UE to use SL mode 2. If it does not comply, the method may include constructing a new RRC Reconfiguration Sidelink message accordingly and restarting the timer T400 (i.e., the value of T400 will be reset to 0 and T400 will start again), once the sensing result is available for using SL mode 2. For instance, in this case, the method may include constructing a new RRC Reconfiguration Sidelink message and restart the timer T400 upon the transmission of the new RRC Reconfiguration Sidelink message.

In one example, if the connection reestablishment procedure or the handover procedure has failed, the method may include switching to SL mode 2 (i.e., UE-autonomous resource-selection mode). In this case, the method may include checking if the configuration acquired from SIB/pre-configuration complies with the configuration in the constructed RRC Reconfiguration Sidelink message. If it does comply, the method may include starting the timer T400, once the sensing result is available to use SL mode 2. If it does not comply, the method may include constructing a new RRC Reconfiguration Sidelink message accordingly, once the sensing result is available for using SL mode 2. And, the method may include restarting the timer T400 upon the transmission of the new RRC Reconfiguration Sidelink message to the lower layers.

In certain embodiments, the SL UE may be configured, by the network, with multiple values for the timer (e.g., T400 timer) or multiple different similar timers associated to the same PC5-RRC procedure. According to some examples, the different values or timers may be used or configured according to the different conditions experienced from the interface between the SL UE and the network (e.g., Uu interface), if there is physical layer problem or connection reestablishment procedure or handover procedure via the (Uu) interface. For example, one value and/or timer may be used for the case where a physical layer problem is not detected and a connection reestablishment and handover is not initiated. Another value and/or timer may be configured to use, for example, when a physical layer problem is detected. In this case, upon the detection of such a physical layer problem, the RRC layer may update the value that will be used to detect the expiry of the timer (e.g., T400 timer). Another value and/or timer may be configured to use, for example, when a connection reestablishment is initiated. Another value and/or timer may be configured to use, for example, when a handover procedure is initiated. And another value and/or timer may be configured to use, for example, when the SL UE uses the exceptional resource pool to transmit the RRC Reconfiguration Sidelink message. According to example embodiments, the multiple values for T400 or multiple different T400-like timers can be applied for the case where the radio problem of Uu is detected before and/or after the submission of the RRCReconfigurationSidelink message to lower layers. Thus, in certain embodiments, the different values or timers used to monitor the PC5 RRC (re)configuration procedure can be configured/updated according to the different radio conditions of the Uu interface.

In an embodiment, the SL UE may be configured, by the network, to extend the timer (e.g., T400 timer) upon the detection of a physical layer problem or the initiation of the connection reestablishment procedure or handover procedure, when the RRC Reconfiguration Sidelink message has been sent to the lower layers and the timer (e.g., T400 timer) has started. According to some examples, the SL UE may be configured with the extension values corresponding to the above-mentioned conditions, e.g., experiencing a physical layer problem, performing a connection reestablishment or handover procedure, or using an exceptional resource pool. In one example, the extension of the timer may be related with the timer configured for monitoring the physical layer recovery procedure or the connection reestablishment or handover procedure.

It should be noted that one or more of the procedures, functions or blocks illustrated in FIG. 1, 2, 3, 4, 5a, 5b or 5c may be optional or may be skipped, according to certain embodiments. As such, FIG. 1, 2, 3, 4, 5a or 5b illustrate some embodiments, but embodiments should not be considered to be limited to these examples alone. Furthermore, in certain embodiments, the examples illustrated in the flow diagrams of FIG. 5a, 5b or 5c may be combined or merged.

Figure 6A:
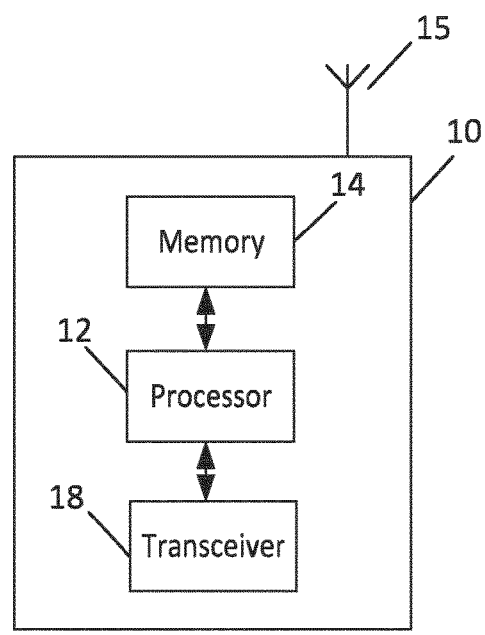
FIG. 6a illustrates an example block diagram of an apparatus, according to an example embodiment.

FIG. 6a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a NW node or RAN node, such as a base station, access point, Node B, eNB, gNB, WLAN access point, or the like. For example, in some embodiments, apparatus 10 may be configured to perform one or more of the processes depicted in any of the flow charts or signaling diagrams described herein, such as those illustrated in FIG. 1, 5*a* or 5*b*. According to an embodiment, apparatus 10 may correspond to the network block shown in the example of FIG. 1. In some embodiments, as discussed herein, apparatus 10 may be configured to perform a procedure relating to monitoring and improving the PC5-RRC (re)configuration procedure in NR SL, for instance.

According to certain embodiments, apparatus 10 may be controlled by memory 14 and processor 12 to configure a SL UE with behaviors for handling and monitoring the PC5 RRC procedures and related timers by taking into account Uu link status/problem.

In some embodiments, apparatus 10 may be controlled by memory 14 and processor 12 to configure the SL UE such that its RRC layer may construct the RRCReconfigurationSidelink message and send it to the lower layers, when there is no radio problem (e.g., a physical layer problem is not detected, and/or a connection re-establishment procedure or a handover procedure is not performed) via the Uu interface, which prevents the SL UE from requesting a SL resource from the network node. For instance, in an embodiment, apparatus 10 may be controlled by memory 14 and processor 12 to configure the RRC layer at the SL UE to construct the RRCReconfigurationSidelink message and send it to the lower layers, only if there is not a physical layer problem or a connection re-establishment procedure or a handover procedure via the Uu interface. Otherwise, in an embodiment, apparatus 10 may be controlled by memory 14 and processor 12 to configure the SL UE such that its RRC layer should not submit the RRCReconfigurationSidelink message to lower layers and, therefore, the timer T400 should not start in this case.

In another embodiment, apparatus 10 may be controlled by memory 14 and processor 12 to configure the SL UE such that, if the SL UE detects a Uu physical layer problem or initiates the Uu connection reestablishment or the handover procedure after constructing the RRCReconfigurationSidelink message and starting timer T400, the SL UE is configured to hold the value of the timer T400 until the Uu physical layer problem is resolved, or the Uu connection re-establishment or the handover procedure is done, or the SL UE enters RRC idle mode. For example, when the SL UE detects a physical layer problem (e.g., the timer T310 starts or the radio channel condition is worse than a configured threshold), apparatus 10 may be controlled by memory 14 and processor 12 to configure the SL UE to place the timer T400 on hold (in other words, T400 will stop but without resetting to its initial value). Once the Uu physical layer problem is resolved in the same serving cell (e.g., T310 stops or the radio channel condition is better than a configured threshold), the SL UE is configured to restart the timer T400 so that it can continue to run.

In an embodiment, apparatus 10 may be controlled by memory 14 and processor 12 to configure a SL UE for handling of a timer (e.g., T400 timer) used for determining when to perform SL reconfiguration failure procedure. In an embodiment, apparatus 10 may be controlled by memory 14 and processor 12 to configure the SL UE with multiple values for the timer (e.g., T400) or multiple different similar timers associated to the same PC5-RRC procedure. According to some examples, the different values or timers may be used according to the condition experienced from the interface between the SL UE and the network (e.g., Uu interface), if there is physical layer problem or connection reestablishment procedure via the (Uu) interface. For example, one value and/or timer may be used for the case where neither a physical layer problem is detected nor a connection reestablishment is initiated. Another value and/or timer may be configured to use, for example, when a physical layer problem is detected. In this case, upon the detection of such a physical layer problem, the RRC layer may update the constant that will be used to detect the expiry of the timer (e.g., T400 timer). Another value and/or timer may be configured to use, for example, when a connection reestablishment is initiated. Another value and/or timer may be configured to use, for example, when the SL UE uses the exceptional resource pool to transmit the RRC Reconfiguration Sidelink message.

In an embodiment, apparatus 10 may be controlled by memory 14 and processor 12 to configure the SL UE to extend the timer (e.g., T400 timer) upon the detection of a physical layer problem or the initiation of the connection reestablishment procedure, when the RRC Reconfiguration Sidelink message has been sent to the lower layers and the timer (e.g., T400 timer) has started. According to some examples, apparatus 10 may be controlled by memory 14 and processor 12 to configure the SL UE with the extension values corresponding to the above-mentioned conditions, e.g., experiencing a physical layer problem, performing a connection reestablishment, or using an exceptional resource pool. In one example, the extension of the timer may be related with the timer configured for monitoring the physical layer recovery procedure or the connection reestablishment procedure. For instance, if the SL UE has been configured with a constant T0 for the T400 timer and constants T1, T2, and T3 to detect the expiry of T301, T310, and T311 timers correspondingly, then: if the SL UE detects a physical layer problem that triggers the start of T310, the constant for T400 can be extended as (T0+T2); if the physical layer problem cannot be resolved and T310 expires, the SL UE may initiate a Uu connection reestablishment procedure, which includes the procedure to select a suitable cell and another procedure to request for RRC reestablishment via the Uu interface. In this case, the constant for the T400 timer can be extended as (T0+T2+T3+T1). In an example embodiment, apparatus 10 may be controlled by memory 14 and processor 12 to configure the SL UE to initiate a Uu connection reestablishment procedure due to other triggers (e.g., RLC failure as the maximum number of retransmissions has been reached). In this case, the constant for the T400 timer can be extended as (T0+T3+T1).

Figure 6C:
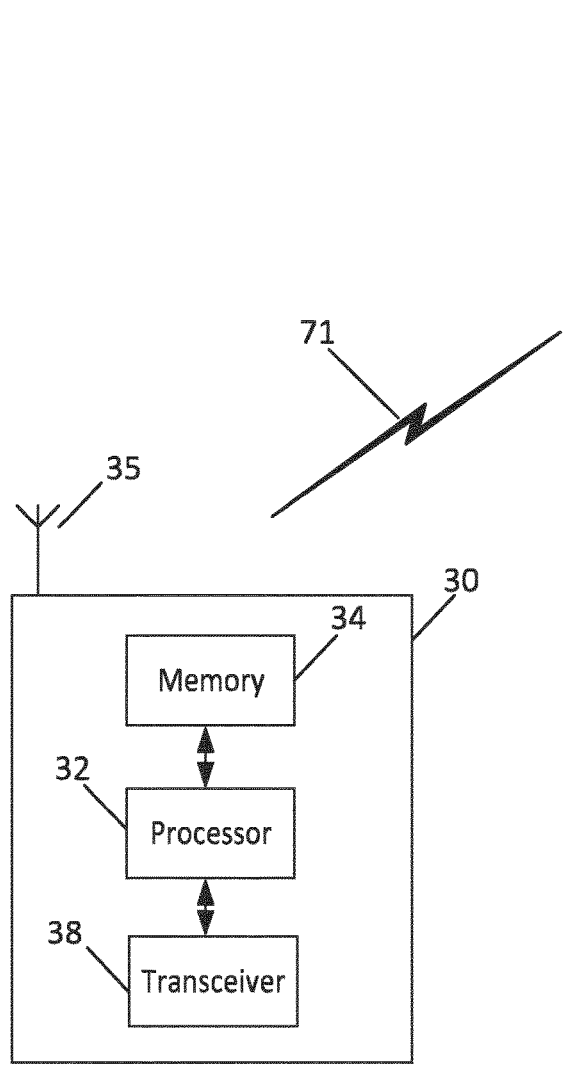
FIG. 6c illustrates an example block diagram of an apparatus, according to an example embodiment.
Figure 6B:
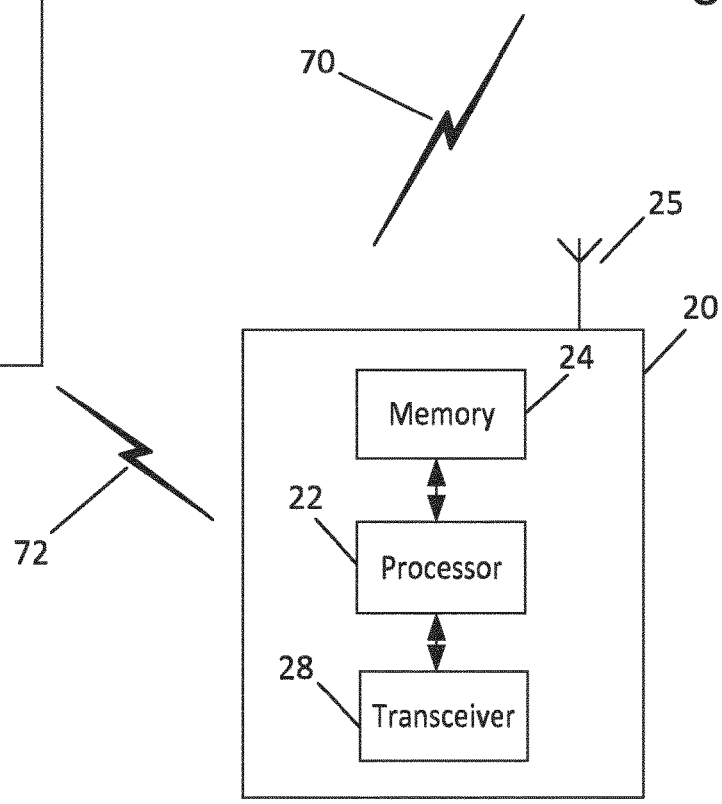
FIG. 6b illustrates an example block diagram of an apparatus, according to an embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE (e.g., SL UE), mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1-4, 5a or 5b. In certain embodiments, apparatus 20 may include or represent a UE, such as a SL UE. In one example embodiment, apparatus 20 may represent a SL TX UE, such as that illustrated in the example of FIG. 1. According to an embodiment, apparatus 10 may be configured to perform a procedure relating to monitoring and improving the PC5-RRC (re)configuration procedure in NR SL, for instance.

In certain embodiments, apparatus 20 may be controlled by memory 24 and processor 22 to determine whether there is a radio problem. For example, the radio problem may include a physical layer problem or a connection re-establishment procedure or a handover procedure via an interface between the SL UE and the network (e.g., the Uu interface). In an embodiment, when it is determined that there is not a radio problem (e.g., there is no physical layer problem, no connection re-establishment procedure via the Uu interface, and/or no handover procedure performed), apparatus 20 may be controlled by memory 24 and processor 22 to construct a RRC Reconfiguration Sidelink message. According to certain embodiments, apparatus 20 may be controlled by memory 24 and processor 22 to transmit the RRC Reconfiguration Sidelink message to the lower layers and to start the timer used to monitor the PC5 RRC (re)configuration procedure (e.g., timer T400). For instance, in an embodiment, the RRC layer of apparatus 20 may be controlled to send the RRC Reconfiguration Sidelink message to the lower layers, only if there is not a physical layer problem or a connection re-establishment procedure or a handover procedure via the Uu interface. Otherwise, when it is determined that there is a radio problem (e.g., physical layer problem or a connection re-establishment procedure or a handover procedure via the Uu interface), apparatus 20 may be controlled by memory 24 and processor 22 to not start the timer used to monitor the PC5 RRC (re)configuration procedure (e.g., timer T400). In some embodiments, if the RRC Reconfiguration Sidelink message was transmitted and timer T400 started, apparatus 20 may be controlled by memory 24 and processor 22 to hold the value of the timer (e.g., T400), once it detects a physical layer problem or a connection re-establishment procedure or a handover procedure via the interface (e.g., Uu interface).

For example, in an embodiment, to determine whether there is a physical layer problem, apparatus 20 may be controlled by memory 24 and processor 22 to check if the T310 timer is running, which denotes that the apparatus 20 has detected N310 consecutive out-of-sync indications from lower layers regarding the Uu interface. Thus, if the T400 timer is started without noticing the timer T310 is running, the T400 timer may expire before the physical layer problem is resolved, and it results in a release of the PC5 link, which is not desirable as it does not reflect the status of the PC5 link. In this embodiment, when it is determined that there is a physical layer problem, apparatus 20 may be controlled by memory 24 and processor 22 to construct the RRC Reconfiguration Sidelink message after the physical layer problem is solved, e.g., when the T310 timer stops.

A similar approach may also apply if the apparatus 20 is trying to perform a Uu connection reestablishment procedure, e.g., when the timers T301 or T311 are running In this case, when it is determined that there is a connection re-establishment procedure via the interface (e.g., Uu interface), apparatus 20 cannot obtain a SL resource from network before the Uu connection is re-established. Thus, T400 should not start in this case in order to avoid that T400 expires before the Uu connection establishment is done, since it will release the PC5 link if T400 expires. In addition, if the UE re-establishes the Uu connection to a new cell, it may obtain new PC5 configuration from the new cell. Therefore, when it is determined that there is a connection re-establishment procedure via the interface (e.g., Uu interface), apparatus 20 may be controlled by memory 24 and processor 22 to construct the RRC Reconfiguration Sidelink message after the connection re-establishment.

In another example, upon receiving RRCReconfiguration message including reconfigurationWithSync, apparatus 20 may be controlled by memory 24 and processor 22 to start its timer T304 and perform handover to the corresponding special cell (SpCell). As a result, apparatus 20 cannot request sidelink resource from network before the handover procedure is successful. Again, as apparatus 20 may obtain new PC5 configuration from the target cell, it would be reasonable for apparatus 20 to wait and construct the RRCReconfigurationSidelink message after the handover procedure.

In an embodiment, apparatus 20 may be controlled by memory 24 and processor 22 to construct and transmit a RRC Reconfiguration Sidelink message and to start a timer used to monitor the PC5 RRC (re)configuration procedure (e.g., timer T400). According to an embodiment, after constructing and transmitting the RRC Reconfiguration Sidelink message and starting the timer, apparatus 20 may be controlled by memory 24 and processor 22 to detect that there is a radio problem (e.g., physical layer problem or a connection re-establishment procedure or a handover procedure via the Uu interface). In an embodiment, apparatus 20 may be controlled by memory 24 and processor 22 to hold the value of the timer (e.g., T400) until the radio problem is resolved.

Thus, in an embodiment, when a physical layer problem is detected or connection reestablishment procedure is started after constructing the RRC Reconfiguration Sidelink message and starting the T400 timer, apparatus 20 may be controlled by memory 24 and processor 22 to hold the value of the timer T400 until the physical layer problem is resolved, the connection re-establishment is done, the handover procedure is done, or the apparatus 20 enters RRC idle mode. For example, when a physical layer problem is detected (e.g., the timer T310 starts or the radio channel condition is worse than a configured threshold), apparatus 20 may be controlled by memory 24 and processor 22 to place the timer T400 on hold (in other words, T400 timer will stop but without resetting its value to 0). Once the physical layer problem is resolved in the same serving cell (e.g., T310 stops or the radio channel condition is better than a configured threshold), apparatus 20 may be controlled by memory 24 and processor 22 to start the T400 timer again.

In an embodiment, when a connection reestablishment procedure is initiated (e.g., due to an RLC failure as the maximal retransmission via the Uu interface has achieved the maximal number, or a handover failure) or a handover procedure is started, apparatus 20 may be controlled by memory 24 and processor 22 to place the timer T400 on hold. Upon a successful Uu re-establishment with the same serving cell, apparatus 20 may be controlled by memory 24 and processor 22 to continue to run the timer T400. Upon a successful connection reestablishment or handover with a new serving cell or when the UE enters RRC idle mode without successful connection re-establishment, apparatus 20 may be controlled by memory 24 and processor 22 to check if the PC5 configuration acquired from the new serving cell (in case of successful Uu reestablishment) or SIB/pre-configuration (in case of entering idle mode) complies with the configuration in the constructed RRC Reconfiguration Sidelink message. If it complies, apparatus 20 may be controlled by memory 24 and processor 22 to start the timer T400 again. In case of entering idle mode and switching to SL mode 2, apparatus 20 may be controlled by memory 24 and processor 22 to start the T400 timer once the sensing result is available at the apparatus 20 to use SL mode 2. If it does not comply, apparatus 20 may be controlled by memory 24 and processor 22 to construct a new RRC Reconfiguration Sidelink message accordingly and restart the timer T400 (i.e., the value of T400 will be reset to 0 and T400 will start again), once the sensing result is available for using SL mode 2. For instance, in this case, apparatus 20 may be controlled by memory 24 and processor 22 to construct a new RRC Reconfiguration Sidelink message and restart the timer T400 upon the transmission of the new RRC Reconfiguration Sidelink message.

In one example, if the connection reestablishment or handover procedure has failed, apparatus 20 may be controlled by memory 24 and processor 22 to switch to SL mode 2 (i.e., UE-autonomous resource-selection mode). In this case, apparatus 20 may be controlled by memory 24 and processor 22 to check if the configuration acquired from SIB/pre-configuration complies with the configuration in the constructed RRC Reconfiguration Sidelink message. If it does comply, apparatus 20 may be controlled by memory 24 and processor 22 to start the timer T400, once the sensing result is available to use SL mode 2. If it does not comply, apparatus 20 may be controlled by memory 24 and processor 22 to construct a new RRC Reconfiguration Sidelink message accordingly, once the sensing result is available for using SL mode 2. And, apparatus 20 may be controlled by memory 24 and processor 22 to restart the timer T400 upon the transmission of the new RRC Reconfiguration Sidelink message to the lower layers.

In certain embodiments, apparatus 20 may be configured, by the network, with multiple values for the timer (e.g., T400 timer) or multiple different similar timers associated to the same PC5-RRC procedure. According to some examples, the different values or timers may be used or configured according to the different conditions experienced from the interface between the apparatus 20 and the network (e.g., Uu interface), if there is physical layer problem or connection reestablishment or handover procedure via the (Uu) interface. For example, one value and/or timer may be used for the case where a physical layer problem is not detected and a connection reestablishment or handover procedure is not initiated. Another value and/or timer may be configured to use, for example, when a physical layer problem is detected. In this case, upon the detection of such a physical layer problem, the RRC layer may update the constant that will be used to detect the expiry of the timer (e.g., T400 timer). Another value and/or timer may be configured to use, for example, when a connection reestablishment is initiated. Another value and/or timer may be configured to use, for example, when a handover procedure is initiated. And another value and/or timer may be configured to use, for example, when the apparatus 20 uses the exceptional resource pool to transmit the RRC Reconfiguration Sidelink message.

In an embodiment, apparatus 20 may be configured, by the network, to extend the timer (e.g., T400 timer) upon the detection of a physical layer problem or the initiation of the connection reestablishment procedure, when the RRC Reconfiguration Sidelink message has been sent to the lower layers and the timer (e.g., T400 timer) has started. According to some examples, apparatus 20 may be configured with the extension values corresponding to the above-mentioned conditions, e.g., experiencing a physical layer problem, performing a connection reestablishment, or using an exceptional resource pool. In one example, the extension of the timer may be related with the timer configured for monitoring the physical layer recovery procedure or the connection reestablishment procedure.

FIG. 6c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 6c.

As illustrated in the example of FIG. 6c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 6c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE (e.g., SL UE), mobile device, mobile station, ME, IoT device and/or NB-IoT device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent a UE, such as one or more of the UE(s) illustrated in FIG. 1, such as the SL RX UE. According to certain example embodiments, apparatus 30 may be configured to perform a procedure relating to monitoring and improving the PC5-RRC (re)configuration procedure in NR SL, for instance.

In some embodiments, apparatus 30 may be controlled by memory 34 and processor 32 to receive a RRC Reconfiguration Sidelink message from an SL UE (e.g., SL TX UE or apparatus 20) and to transmit a RRC Reconfiguration Complete Sidelink message to the SL UE (e.g., the SL TX UE or apparatus 20).

Therefore, certain example embodiments provide several technological improvements, enhancements, and/or advantages over existing technological processes and constitute an improvement at least to the technological field of wireless network control and management. For example, certain embodiments enable a SL UE to avoid PC5-RRC radio link failure, for instance, such as that due to a Uu radio link problem. As a result, according to example embodiments, SL UEs can maintain V2X services since the PC5 connection and communication are able to continue. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
   determining, at a sidelink (SL) user equipment (UE), whether there is a radio problem of an interface between the sidelink (SL) user equipment (UE) and a network node;
   when it is determined that there is not a radio problem of the interface, generating or constructing a radio resource control (RRC) reconfiguration sidelink message,
   the method further comprising:
   when it is determined that there is a radio problem of the interface between the sidelink (SL) user equipment (UE) and the network node, holding a value of the timer until the radio problem of the interface is resolved,
   wherein the determining that there is the radio problem of the interface comprises detecting a physical layer problem or initiation of a connection re-establishment procedure or a handover procedure via a Uu interface,
   wherein, upon a successful connection reestablishment or successful handover procedure with a new serving cell or when the sidelink (SL) user equipment (UE) enters radio resource control (RRC) idle mode without successful connection re-establishment or handover, the method comprising:
   checking if the PC5 configuration acquired from the new serving cell or system information block (SIB)/pre-configuration complies with the configuration in the constructed radio resource control (RRC) reconfiguration sidelink message;
   if the PC5 configuration or the system information block (SIB)/pre-configuration complies, starting the timer with the existing value again; and
   if the PC5 configuration or the system information block (SIB)/pre-configuration does not comply, constructing a new radio resource control (RRC) reconfiguration sidelink message accordingly and restarting the timer with the initial value.

2. The method of claim 1, wherein the determining of whether there is a radio problem comprises determining whether there is a physical layer problem or a connection re-establishment procedure or a handover procedure via an interface between the sidelink (SL) user equipment (UE) and the network node; and
   when it is determined that there is not a physical layer problem or a connection re-establishment procedure or a handover procedure via the interface, the method comprises transmitting the radio resource control (RRC) reconfiguration sidelink message to lower layers and starting a timer.

3. The method of claim 2, wherein the transmitting comprises sending, via the radio resource control (RRC) layer at the sidelink (SL) user equipment (UE), the radio resource control (RRC) reconfiguration sidelink message to the lower layers, if there is not a physical layer problem or a connection re-establishment procedure or a handover procedure.

4. The method of claim 2, wherein, when it is determined that there is a physical layer problem or a connection re-establishment procedure or a handover procedure via the interface, the method comprises not generating or constructing the radio resource control (RRC) reconfiguration sidelink message and not starting the timer used to monitor the PC5-radio resource control (RRC) configuration procedure.

5. The method of claim 1, wherein the determining of whether there is a radio problem comprises determining at least one of: whether one or more exceptional resource pools are configured, or whether the sidelink (SL) user equipment (UE) has received configured grant type of resources before the radio problem is detected.

6. The method of claim 1, wherein the constructing of the radio resource configuration (RRC) reconfiguration sidelink message is performed at the radio resource control (RRC) layer of the sidelink (SL) user equipment (UE).

7. The method of claim 1, wherein the determining comprises checking one or more timer(s) configured for monitoring at least one of a physical layer recovery procedure, the connection reestablishment procedure, or the handover procedure.

8. The method of claim 1, wherein, when it is determined that there is a connection re-establishment procedure or a handover procedure via the interface, the constructing comprises constructing the radio resource control (RRC) reconfiguration sidelink message after the connection re-establishment or handover to a target cell.

9. An apparatus, comprising:
   at least one processor; and
   at least one memory comprising computer program code,
   wherein the at least one memory and computer program code are configured, with the at least one processor, to cause the apparatus at least to perform:
   determining whether there is a radio problem of an interface between the apparatus and a network node;
   when it is determined that there is not a radio problem of the interface, generating or constructing a radio resource control (RRC) reconfiguration sidelink message, wherein the at least one memory and computer program code are configured, with the at least one processor, to cause the apparatus at least to perform:
when it is determined that there is a radio problem of an interface between the apparatus and a network node, holding a value of the timer until the radio problem of the interface is resolved,
wherein the determining that there is the radio problem of the interface comprises detecting a physical layer problem or initiation of a connection re-establishment procedure or a handover procedure via a Uu interface,
wherein, upon a successful connection reestablishment or successful handover procedure with a new serving cell or when the apparatus enters radio resource control (RRC) idle mode without successful connection re-establishment or handover, the at least one memory and computer program code are configured, with the at least one processor, to cause the apparatus at least to perform:
checking if the PC5 configuration acquired from the new serving cell or system information block (SIB)/pre-configuration complies with the configuration in the constructed radio resource control (RRC) reconfiguration sidelink message;
if the PC5 configuration or the system information block (SIB)/pre-configuration complies, starting the timer with the existing value again; and
if the PC5 configuration or the system information block (SIB)/pre-configuration does not comply, constructing a new radio resource control (RRC) reconfiguration sidelink message accordingly and restarting the timer with the initial value.

10. The apparatus of claim 9, wherein the determining of whether there is a radio problem comprises determining whether there is a physical layer problem or a connection re-establishment procedure or a handover procedure via an interface between the sidelink (SL) user equipment (UE) and the network node; and
when it is determined that there is not a physical layer problem or a connection re-establishment procedure or a handover procedure via the interface, the at least one memory and computer program code are configured, with the at least one processor, to cause the apparatus at least to perform: transmitting the radio resource control (RRC) reconfiguration sidelink message to lower layers and starting a timer.

11. The apparatus of claim 10, wherein the transmitting comprises sending, via the radio resource control (RRC) layer at the apparatus, the radio resource control (RRC) reconfiguration sidelink message to the lower layers, if there is not a physical layer problem or a connection re-establishment procedure or a handover procedure.

12. The apparatus of claim 10, wherein, when it is determined that there is a physical layer problem or a connection re-establishment procedure or a handover procedure via the interface, the at least one memory and computer program code are configured, with the at least one processor, to cause the apparatus at least to perform: skipping the generating or constructing the radio resource control (RRC) reconfiguration sidelink message and skipping the starting of the timer used to monitor the PC5-radio resource control (RRC) configuration procedure.

13. The apparatus of claim 9, wherein the determining of whether there is a radio problem comprises determining at least one of: whether one or more exceptional resource pools are configured, or whether the apparatus has received configured grant type of resources before the radio problem is detected.

14. The apparatus of claim 9, wherein the constructing of the radio resource configuration (RRC) reconfiguration sidelink message is performed at the radio resource control (RRC) layer of the apparatus.

15. The apparatus of claim 9, wherein the determining comprises checking one or more timer(s) configured for monitoring at least one of a physical layer recovery procedure, the connection reestablishment procedure, or the handover procedure.

16. The apparatus of claim 9, wherein, when it is determined that there is a connection re-establishment procedure or a handover procedure via the interface, the constructing comprises constructing the radio resource control (RRC) reconfiguration sidelink message after the connection re-establishment or handover to a target cell.

17. A method, comprising:
generating or constructing, at sidelink (SL) user equipment (UE), a radio resource control (RRC) reconfiguration sidelink message; and
starting a timer used to monitor the PC5-radio resource control (RRC) configuration procedure,
the method further comprising:
detecting that there is a radio problem of an interface between the sidelink (SL) user equipment (UE) and a network node; and
holding a value of the timer until the radio problem of the interface is resolved,
wherein the detecting that there is the radio problem of the interface comprises detecting a physical layer problem or initiation of a connection re-establishment procedure or a handover procedure via a Uu interface,
wherein, upon a successful connection reestablishment or successful handover procedure with a new serving cell or when the sidelink (SL) user equipment (UE) enters radio resource control (RRC) idle mode without successful connection re-establishment or handover, the method comprising:
checking if the PC5 configuration acquired from the new serving cell or system information block (SIB)/pre-configuration complies with the configuration in the constructed radio resource control (RRC) reconfiguration sidelink message;
if the PC5 configuration or the system information block (SIB)/pre-configuration complies, starting the timer with the existing value again; and
if the PC5 configuration or the system information block (SIB)/pre-configuration does not comply, constructing a new radio resource control (RRC) reconfiguration sidelink message accordingly and restarting the timer with the initial value.

18. The method of claim 17, wherein, when a physical layer problem is detected or connection reestablishment procedure or handover procedure is started after constructing the radio resource control (RRC) reconfiguration sidelink message and starting the timer, the method comprises:
holding the value of the timer until the physical layer problem is resolved, or the connection re-establishment or the handover procedure is done, or the sidelink (SL) user equipment (UE) enters idle mode; and
when the physical layer problem is resolved or the connection re-establishment is performed in the same serving cell, starting the timer using the existing value again.

19. The method of claim 17, wherein, when a connection reestablishment procedure or a handover procedure is initiated, the method comprises placing the timer on hold.

20. The method of claim 17, wherein, when the connection reestablishment procedure or the handover procedure has failed, the method comprising:
switching to a sidelink (SL) mode 2;
checking if the configuration acquired from system information block (SIB)/pre-configuration complies with the configuration in the constructed radio resource control (RRC) reconfiguration sidelink message;
if the acquired configuration does comply, starting the timer with the existing value, once a sensing result is available to use sidelink (SL) mode 2;
if the acquired configuration does not comply, constructing a new radio resource control (RRC) reconfiguration sidelink message accordingly and starting the timer, once the sensing result is available for using sidelink (SL) mode 2.

21. The method of claim 17, wherein the sidelink (SL) user equipment (UE) is configured with multiple values for the timer or multiple different timers associated to the same PC5-radio resource control (RRC) procedure, and wherein the different values or timers are used according to a condition experienced from the interface between the sidelink (SL) user equipment (UE) and the network.

22. The method of claim 17, wherein the sidelink (SL) user equipment (UE) is configured to extend the timer upon the detection of a physical layer problem or the initiation of the connection reestablishment procedure or a handover procedure, when the radio resource control (RRC) reconfiguration sidelink message has been sent to lower layers and the timer has started.

23. An apparatus, comprising:
at least one processor; and
at least one memory comprising computer program code,
wherein the at least one memory and computer program code are configured, with the at least one processor, to cause the apparatus at least to perform:
generating or constructing a radio resource control (RRC) reconfiguration sidelink message; and
starting a timer used to monitor the PC5-radio resource control (RRC) configuration procedure,
wherein the at least one memory and computer program code are configured, with the at least one processor, to cause the apparatus at least to perform:
detecting that there is a radio problem of an interface between the sidelink (SL) user equipment (UE) and a network node; and
holding a value of the timer until the radio problem of the interface is resolved,
wherein the detecting that there is the radio problem of the interface comprises detecting a physical layer problem or initiation of a connection re-establishment procedure or a handover procedure via a Uu interface,
wherein, upon a successful connection reestablishment or successful handover procedure with a new serving cell or when the apparatus enters radio resource control (RRC) idle mode without successful connection re-establishment or handover, the at least one memory and computer program code are configured, with the at least one processor, to cause the apparatus at least to perform:
checking if the PC5 configuration acquired from the new serving cell or system information block (SIB)/pre-configuration complies with the configuration in the constructed radio resource control (RRC) reconfiguration sidelink message;
if the PC5 configuration or the system information block (SIB)/pre-configuration complies, starting the timer with the existing value again; and
if the PC5 configuration or the system information block (SIB)/pre-configuration does not comply, constructing a new radio resource control (RRC) reconfiguration sidelink message accordingly and restarting the timer with the initial value.

24. The apparatus of claim 23, wherein, when a physical layer problem is detected or connection reestablishment procedure or handover procedure is started after constructing the radio resource control (RRC) reconfiguration sidelink message and starting the timer, the at least one memory and computer program code are configured, with the at least one processor, to cause the apparatus at least to perform:
holding the value of the timer until the physical layer problem is resolved, or the connection re-establishment or the handover procedure is done, or the apparatus enters idle mode; and
when the physical layer problem is resolved or the connection re-establishment is performed in the same serving cell, starting the timer using the existing value again.

25. The apparatus of claim 23, wherein, when a connection reestablishment procedure or a handover procedure is initiated, the at least one memory and computer program code are configured, with the at least one processor, to cause the apparatus at least to perform: placing the timer on hold.

26. The apparatus of claim 23, wherein, when the connection reestablishment procedure or the handover procedure has failed, the at least one memory and computer program code are configured, with the at least one processor, to cause the apparatus at least to perform:
switching to a sidelink (SL) mode 2;
checking if the configuration acquired from system information block (SIB)/pre-configuration complies with the configuration in the constructed radio resource control (RRC) reconfiguration sidelink message;
if the acquired configuration does comply, starting the timer with the existing value, once a sensing result is available to use sidelink (SL) mode 2;
if the acquired configuration does not comply, constructing a new radio resource control (RRC) reconfiguration sidelink message accordingly and starting the timer, once the sensing result is available for using sidelink (SL) mode 2.

27. The apparatus of claim 23, wherein the apparatus is configured with multiple values for the timer or multiple different timers associated to the same PC5-radio resource control (RRC) procedure, and wherein the different values or timers are used according to a condition experienced from the interface between the apparatus and the network.

* * * * *